United States Patent
Nongpiur et al.

(10) Patent No.: US 12,200,465 B2
(45) Date of Patent: Jan. 14, 2025

(54) SPATIAL AUDIO RECORDING FROM HOME ASSISTANT DEVICES

(71) Applicant: Google LLC, Mountain View, CA (US)

(72) Inventors: Rajeev Conrad Nongpiur, Mountain View, CA (US); Qian Zhang, Mountain View, CA (US); Andrew James Sutter, Los Gatos, CA (US); Kung-Wei Liu, Taipei (TW); Jihan Li, San Jose, CA (US); Hélène Bahu, San Francisco, CA (US); Leonardo Kusumo, San Jose, CA (US); Sze Chie Lim, Mountain View, CA (US); Marco Tagliasacchi, Zurich (CH); Neil Zeghidour, Paris (FR); Michael Takezo Chinen, El Cerrito, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/748,356

(22) Filed: May 19, 2022

(65) Prior Publication Data
US 2023/0379645 A1 Nov. 23, 2023

(51) Int. Cl.
*H04S 3/00* (2006.01)
*G06N 20/00* (2019.01)
*G10L 19/008* (2013.01)
*H04R 3/00* (2006.01)
*H04R 5/027* (2006.01)
*H04S 7/00* (2006.01)

(52) U.S. Cl.
CPC .............. *H04S 7/30* (2013.01); *G06N 20/00* (2019.01); *G10L 19/008* (2013.01); *H04R 3/005* (2013.01); *H04R 5/027* (2013.01); *H04S 3/008* (2013.01); *H04R 2420/07* (2013.01); *H04S 2400/01* (2013.01); *H04S 2400/11* (2013.01); *H04S 2400/15* (2013.01); *H04S 2420/03* (2013.01); *H04S 2420/11* (2013.01)

(58) Field of Classification Search
CPC .. H04S 2420/11; H04S 2400/15; H04R 3/005
See application file for complete search history.

(56) References Cited

U.S. PATENT DOCUMENTS

| | | | |
|---|---|---|---|
| 2014/0198918 A1 | 7/2014 | Li et al. | |
| 2020/0037091 A1* | 1/2020 | Jeon | H04S 7/306 |
| 2020/0245092 A1 | 7/2020 | Badhwar et al. | |
| 2021/0014630 A1 | 1/2021 | Leppanen et al. | |
| 2021/0304777 A1* | 9/2021 | Kim | H04R 5/00 |
| 2023/0238003 A1* | 7/2023 | Nam | G10L 19/008 |
| | | | 704/500 |

* cited by examiner

*Primary Examiner* — Ping Lee
(74) *Attorney, Agent, or Firm* — Colby Nipper PLLC

(57) ABSTRACT

The technology generally relates to spatial audio communication between devices. For example, a first device and a second device may be connected via a communication link. The first device may capture audio signals in an environment through two or more microphones. The first device may encode the captured audio with spatial configuration data. The first device may transmit the encoded audio via the communication link to the second device. The second device may decode the encoded audio into binaural or ambisonic audio to be output by one or more speakers of the second device. The binaural or ambisonic audio may be converted into spatial audio to be output. The second device may output the binaural or spatial audio to create an immersive listening experience.

20 Claims, 10 Drawing Sheets

SPATIAL AUDIO RECORDING FROM HOME ASSISTANT DEVICES

BACKGROUND

Communication devices are often used to transmit audio, such as conversations, over a distance. The audio transmitted from a first communication device to the second device is typically output as mono audio, thereby lacking spatial cues. A second user listening to the output audio may have a dull listening experience, because without spatial cues, the second user does not have a sense of where the first user was positioned relative to the first device. Moreover, when the speakers of the second device output the audio equally, the second user does not have an immersive listening experience.

BRIEF SUMMARY

The technology generally relates to spatial audio communication between devices. For example two devices may be connected via a communication link. A source device may capture audio signals in an environment through two or more microphones. The microphones may be positioned on and/or around the first device to optimize capturing audio and spatially encoding the captured audio. The source device may encode the captured audio using a trained machine learning model. The machine learning model may be trained based on the type of source device. For example, the machine learning model may be trained based on the shape of the source device as the shape of the source device may impact how the audio is captured and/or output by the source device. The machine learning model may be trained to encode the captured audio based on how the audio is captured by the device. In some examples, the machine learning model may encode the captured audio to include spatial data, such as binaural or ambisonic configuration data. The encoder may compress the encoded audio. The source device may transmit the compressed encoded audio via the communication link to a target device.

The target device may decode the encoded audio using a trained machine learning model that was jointly trained with the encoder of the source device. For example, the trained machine learning mode may decode the encoded audio to be spatially output such that the audio output by the target device corresponds, or substantially corresponds, to how a user would have heard the audio if they were in the spatial position of the audio source. The target device may decode the encoded audio into binaural or ambisonic audio. In some examples, the source device may convert, or transform, the binaural or ambisonic audio into spatial audio. The binaural or spatial audio may be output by one or more speakers of the target device.

A first aspect of the disclosure is directed to a system comprising an encoder trained with a machine learning ("ML") model, the encoder configured to encode audio input received from a plurality of microphones of a source device and a decoder jointly trained with the ML model of the encoder. The decoder may be adapted to receive the encoded audio from the encoder and decode the received encoded audio into one of binaural or ambisonic output such that the decoded audio corresponds to how the audio input was received at the plurality of microphones of the source device.

The system may comprise the source device and a target device in wireless communication with one another. The encoder may be in the source device and the decoder may be in the target device. The target device may further include an output configured to output the binaural or ambisonic output. The target device may further include an orientation module configured to convert the ambisonic output into one of binaural or spatial output. The source device may be configured to transmit, via a communication link, the encoded audio to the target device.

The ML model may be trained using training data comprising audio data labeled with respective compressed spatial audio signals. The source device may be one of an assistant hub, thermostat, smart display, audio playback device, smart watch, doorbell, security camera. The encoder may be further configured to compress the encoded audio. The decoded audio, when output, may have the same spatial characteristics as the audio input received by the plurality of microphones of the source device.

A first microphone of the plurality of microphones is beamformed in a first direction and a second microphone of the plurality of microphones is beamformed in a second direction different than the first direction. The encoder may be further configured to encode audio input received from the first and second microphones with data corresponding to the first beamformed direction and the second beamformed direction. The decoded audio, when output, may be configured to sound as if the output audio is from a position with respect to an output speaker corresponding to a source position of the audio input.

Another aspect of the disclosure is directed to a method comprising encoding, by an encoder trained with a machine learning ("ML") model, audio input received from a plurality of microphones of a source device, receiving, by a decoder jointly trained with the ML model of the encoder, the encoded audio, and decoding, by the decoder, the received compressed output into one of binaural or ambisonic output such that the decoded audio corresponds to how the audio input was received at the plurality of microphones at the source device.

Yet another aspect of the disclosure is directed to a system comprising a decoder jointly trained with an encoder configured to encode and compress audio input received from a plurality of microphones. The decoder may be adapted to receive the encoded and compressed output from the encoder, decode the encoded and compressed output using an ML model that was jointly trained with the encoder, and transform the received compressed output into one of binaural or ambisonic output such that the transformed output corresponds to how the input was received at the plurality of microphones of a first device.

DETAILED DESCRIPTION

Figure 1:
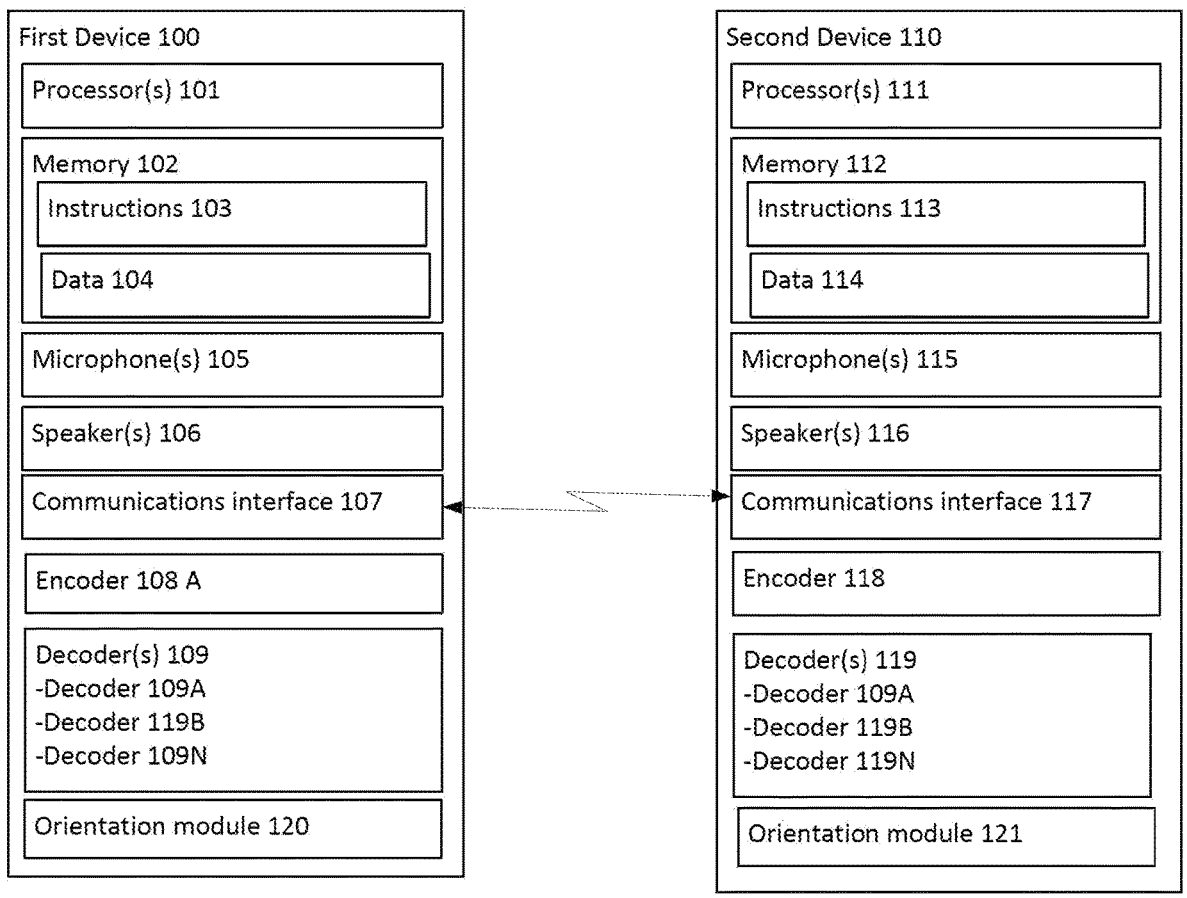
FIG. 1 is a block diagram of an example system in accordance with aspects of the disclosure.

The technology generally relates to a system that transforms audio received from a plurality of microphones into binaural or ambisonic output. The binaural or ambisonic output may be further converted into spatial audio output. The system may include a source device and a target device connected via a communication link. The source device may include a plurality of microphones, in any arbitrary configuration, configured to capture audio signals. An encoder trained using a machine learning ("ML") model encodes the captured audio signals along with spatial data, such as binaural or ambisonic configuration data. The encoder may compress the encoded audio. The source device transmits the compressed encoded audio via the communication link to the target device. The target device decodes the encoded audio using a trained ML model that was jointly trained with the encoder of the target device. The decoder may decode the encoded audio into binaural or ambisonic audio. The decoded audio may correspond to how the audio signals were captured by the target device. For example, the decoded audio may be played back through one or more speakers coupled with the target device such that a spatial effect of the audio with respect to a listener is the same as if the listener was standing at the source device at the time of initial audio capture.

The encoder of the source device may be jointly trained with the decoder of the target device. By jointly training the encoder and decoder, the target device may efficiently decode the encoded signal regardless of the configuration of the microphones of the source device. Jointly training the encoder and the decoder may reduce the size of the ML model and, therefore, increase the efficiency of both the source device and the target device as compared to training the encoder and decoder separately. For example, by jointly training the encoder and decoder, the encoder may encode and compress the captured audio based on the specific configuration of the source device. This may require less data as the decoder that is jointly trained with the encoder may be configured to decode the encoded audio. In comparison, when using a standard compression algorithm, the compressed audio may include additional data for a plurality of formats and/or decoders, which may result in more data and, therefore, a larger transmission bit rate.

In one example, the system may include multiple different devices connected via a communication link. When the different devices initially connect, each device may identify the other devices it is connected to. For example, during the connection initiation, packets of data may be transmitted. Within the data packets there may be a header that identifies a source device and a target device. The source device may be the device capturing audio signals to be transmitted to the target device. The target device may be the device intended to receive the audio signals captured by the source device. The target device may output the received audio signals. While the disclosure herein describes a source device and a target device, it should be understood that the source device may also function as a target device and the target device may also function as a source device.

The source device may capture audio signals in an environment through two or more microphones. The source device may have any shape and the microphones may be placed at any location on the first device such that the microphones may capture audio signals at different times and/or from different angles. The source device may include an encoder configured to encode the captured audio using a trained machine learning ("ML") model. The ML model may be a neural network. The ML model may encode the captured audio to include spatial data, such as transfer functions or binaural or ambisonic configuration data. The encoded spatial data may be specific to the source device. For example, the encoded spatial data may be specific to the shape of the device and/or configuration of microphones on the source device. In such an example, the ML mode may be trained to encode the captured audio signals with spatial data based on the shape of the device and/or the configuration of microphones capturing the audio signals. Thus, the ML model may be trained specifically for a type of source device. The ML model may, additionally or alternatively, compress the encoded audio. The ML model may output compressed encoded audio. In some examples, the compressed encoded audio may be specific to the source device. The source device may transmit the compressed encoded audio to the second device.

The target device may decode the encoded audio into binaural or ambisonic audio to be output by one or more speakers of the second device. The target device may decode the compressed encoded audio using a decoder that was jointly trained with the encoder of the source device. For example, the target device may decode the compressed encoded audio using a trained ML model. The ML model to decode the encoded audio may be trained jointly with the ML model trained to encode the captured audio. In such an example, the ML model to decode the encoded audio may be trained to decode the encoded audio to correspond or substantially correspond to how a user would have heard the audio if they were at the location of the audio source. The target device may identify the decoder to use to decode the encoded audio based on the information transmitted during the initial connection of the source and target device. For example, the target device may include one or more decoders. In an example where the target device includes multiple decoders, the target device may identify the decoder that was jointly trained with the encoder of the source device. In examples where the target devices includes a single decoder, the decoder may be trained with a single model that can decode encoded audio received from multiple devices based on identifying the type of the source device during the initial connection.

In some examples, the target device may decode the encoded audio into binaural or ambisonic audio based on a listening orientation. Additionally or alternatively, the target device may further convert the binaural or ambisonic audio into spatial audio based on a listening orientation.

Training the encoder of the source device and the decoder of the target device together may reduce the size of the ML model and, therefore, increase the computational efficiency of the device as compared to training the encoder and decoder separately. For example, the encoder of the source device may be trained to encode and compressed captured audio specific to the shape of the source device and/or the configuration of microphones on the source device. Using an ML model to encode the captured audio specific to the source device, the encoded audio may be encoded and compressed more efficiently than standard compression techniques, which may encode the captured audio without considering the shape of the device and/or the location of the microphones. In some examples, when using the ML model to encode the captured audio specific to the source device, the encoded audio may be transmitted to the target device using a lower data transmission rate as compared standard compression techniques. The decoder of the target device may be trained to decode the specific encoded audio received from the source device.

The size of the encoder and decoder may be optimized based on predetermined constraints, such as the minimum data rate required for transmission. This may allow for the encoder and decoder to transmit and receive encoded audio at a lower rate as compared to an encoder and decoder that were trained separately. Additionally or alternatively, by training the encoder and decoder jointly, the quality of the transmission may by gradual as the transmission rate decreases as compared to a standard compression transmission, which may not transmit anything if the transmission rate goes below a threshold.

The jointly trained encoder and decoder may provide for binaural, ambisonic, and/or spatial audio regardless of the shape, size, and/or microphone configuration of the device.

Using a trained machine learning model to encode and compress the captured audio may decrease the data required to transmit the compressed encoded audio to the second device as compared to transmitting the audio signals via multiple and/or separate channels. According to some examples, the encoder may compress the encoded audio prior to transmitting the encoded audio to another device. The compressed encoded audio may require less data for transmission as compared to transmitting raw audio signals.

In some examples, by encoding the audio using a trained machine learning model to include spatial configuration data, such as binaural or ambisonic configuration data, the device may spatially output the audio to provide a vibrant and/or immersive listening experience. For example, the device receiving the encoded audio may decode the encoded audio into binaural or ambisonic audio. The device may output the binaural audio such that a user hears the audio output in a 360-degree space around them. For example, the device may output binaural audio such that the output sounds the same regardless of a listener's location and/or head orientation relative to the speakers of the device. According to some examples, the device may convert, or transform, the ambisonic audio into binaural audio or spatial audio for output. The spatial audio may output to correspond, or substantially correspond, to how a user would have heard the audio signals if the user were positioned at or near the source of the audio signals.

Example Systems

FIG. 1 illustrates an example system including two devices. In this example, system 1000 may include a first device 100 and a second device 110. The devices 100, 110 may each be, for example, a smartphone, smart watch, AR/VR headset, smart helmet, computer, laptop, tablet, home assistant device that is capable of receiving audio signals and outputting audio, etc. According to some examples, the home assistant device may be an assistant hub, thermostat, smart display, audio playback device, smart watch, doorbell, security camera, etc. The devices 100, 110 may be a same type of device or different types. The device 100, 110 may have an arbitrary shape. The shape of each device 100, 110 may depend on the type of device and/or intended use of the device. The shape of the device 100, 110 may, in some examples, affect the configuration of the microphones and, therefore, how audio signals are captured.

The first device 100 may include one or more processors 101, memory 102, instructions 103, data 104, one or more microphones 105, one or more speakers 106, a communications interface 107, an encoder 108, one or more decoders 109, and an orientation module.

The one or more processors 101 may be any conventional processors, such as commercially available microprocessors. Alternatively, the one or more processors may be a dedicated device such as an application specific integrated circuit (ASIC) or other hardware-based processor. Although FIG. 1 functionally illustrates the processor, memory, and other elements of first device 100 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of first device 100. Accordingly, references to a processor or computing device should be understood to include references to a collection of processors or computing devices or memories that may or may not operate in parallel.

Memory 102 may store information that is accessible by the processors, including instructions 113 that may be executed by the processors 101, and data 104. The memory 102 may be a type of memory operative to store information accessible by the processors 101, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 103 and data 104 are stored on different types of media.

Memory 102 may be retrieved, stored or modified by processors 101 in accordance with the instructions 103. For instance, although the present disclosure is not limited by a particular data structure, the data 104 may be stored in computer registers, in a relational database as a table having a plurality of different fields and records, XML documents, or flat files. The data 114 may also be formatted in a computer-readable format such as, but not limited to, binary values, ASCII or Unicode. Moreover, the data 104 may comprise information sufficient to identify the relevant information, such as numbers, descriptive text, proprietary codes, pointers, references to data stored in other memories (including other network locations) or information that is used by a function to calculate the relevant data.

The instructions 103 can be any set of instructions to be executed directly, such as machine code, or indirectly, such as scripts, by the processor 101. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Although FIG. 1 functionally illustrates the processor, memory, and other elements of devices 100, 110 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the devices 100, 110. Accordingly, references to a processor or computing device will be understood to include references to a collection of processors or computing devices or memories that may or may not operate in parallel.

The first device 100 may include one or more microphones 105. The microphones 105 may capture, or receive, audio signals and/or input within an environment. Microphones 105 may be beamformed in different directions. For example, the first device 100 may include a first microphone 105 beamformed in a first direction and a second microphone 105 may be beamformed in a second direction different than the first direction. The microphones may be integrated into first device 100. For example, the microphones 105 may be located at a surface of the housing of first device 100. The microphones 105 may reside at different portions of the housing of the first device 100, and therefore be positioned at different coordinates in an environment in which the first device 100 is located. For example, first device 100 may have a right, left, and center microphone built into first device 100. The right, left, and center microphones 105 may be positioned at different coordinates on first device 100 relative to each other. In some examples, one or more microphones 105 may be wired and/or wirelessly connected to first device 100 and positioned around the environment at different coordinates relative to first device 100. For example, a first microphone 105 that is wirelessly connected to first device 100 may be positioned at a height above and to the left relative to first device 100 while a second microphone 105 that is wirelessly connected to first device 100 may be positioned below, to the right, and to the front relative to first device 100. In some examples, each of the microphones 105, whether built-in, wirelessly connected, and/or connected via a wire, may be positioned on first device 100 and/or around the environment at different distances relative to first device 100.

The first device 100 may further include communications interface 107, such as an antenna, transceiver, and any other devices used for wireless communication. The first device 100 may be configured for communicative coupling to second device 110 via a wireless connection and/or communication link, such as Bluetooth, short-range wireless pairing, 4G, 5G, or 6G communications, etc.

The 5G or 6G communications interface may provide for network slicing. Network slicing supports customizing the capacity and capabilities of a network for different services, such as connected home, video/audio streaming (buffered or real-time), etc. Edge data center processing and local data center processing augments central data center processing to allocate 5G, 6G, and future network resources to enable home assistant devices, smartphones, home entertainment systems, industrial sensors, smart watches, AR/VR/XR headsets, and other wirelessly-connected devices.

Not only can terrestrial network equipment support connected home, video/audio streaming (buffered or real-time), etc., non-terrestrial network equipment such as drones, satellites, and balloons can enable 5G, 6G, and future wireless communications in additional environments such as marine, rural, and other locations that experience inadequate base station coverage.

Prior to and/or during the initiation of the communication link between the first device 100 and second device 200, packets of data may be transmitted between first device 100 and second device 200. Within the packets of data may be, for example, information identifying the source device and the target device. In some examples, the information may include a type of source device and a type of target device. The identification of the source device and/or the type of the source device may be used by the target device to identify a decoder corresponding to an encoder of the source device.

First device 100 may transmit content to second device 110 via the communication link. The content may be, for example, encoded audio. According to some examples, first device 100 may receive content from second device 110 via the communication link. The content may include encoded audio signals captured up by microphones 105 on the second device 110.

First device 100 may include an encoder 108. Encoder 108 may encode audio signals captured by microphones 105 based on a trained machine learning ("ML") model. The ML model may be a neural network. The ML model of the encoder 108 may be trained based on the type of device of first device 100, the shape of first device 100, the number, positions of the microphones 105 of first device 100, the beamformed configuration of the microphones 105, etc. For example, the ML model of the encoder 108 may be trained to encode audio captured by microphones 105 to be spatial audio corresponding, or substantially corresponding, to how a user would have spatially head the audio if they were at the location of the audio source. The spatial audio may be, in some examples, based on the shape of first device 100, the number of microphones 105 of first device 100, etc. as the shape, the number of microphones may impact how first device 100 captures the audio signals, the beamformed configuration of the microphones, etc. For example, the shape of the device 100 may affect the arrangement and/or number of microphones 105. This may, in some examples, affect how microphones 105 capture the audio signals. The encoder 108 may encode the captured audio with data corresponding to the microphone configuration. For example, based on the microphone configuration, the encoder may encode the captured audio with spatial information. The spatial information may be, in some examples, a location of the source of the audio signals with respect to the microphones 105.

The encoder 108 may encode features of the audio signals into an intermediary representation. The features may be, for example, transfer functions. The transfer functions may be, for example, related to a spatial audio configuration. The spatial audio configuration may be binaural, ambisonic, or spatial. The intermediary representation may be a compressed audio signal. In some examples, the intermediary representation may have a low bit rate for transmission. According to some examples, the intermediary representation may have a lower bit rate for transmission as compared to having to convert the captured audio signals into a standard format for transmission. For example, the intermediary representation may have a lower bit rate for transmission as the encoded and compressed audio may be specific to the first device 100 whereas captured audio signals that are not encoded and compressed may be converted to a standard format to be output to any device.

Decoders 109 may decode the intermediary representation based on the trained ML model. For example, each decoder 109 may correspond to a respective trained encoder. In some examples, decoder 109 may be jointly trained with the ML model of the respective encoder. According to some examples, decoder 109 may be jointly trained with multiple encoders such that a single decoder 109 may be configured to decode compressed encoded audio from a plurality of encoders. Training the decoder jointly with a respective encoder may optimize the efficiency of encoding and decoding audio signals. For example, the jointly trained encoder and decoder may be configured to encode and decode, respectively, audio for a specific type of device. In such an example, the source device may be an assistant hub such that the encoder is configured to encode audio captured by the home assistant device based on the shape and/or microphone configuration such that the encoded audio includes spatial data specific to the shape and/or microphone configuration. The target device may be a smart display. The decoder of the smart display may be trained to decode the encoded audio received from the source device such that when outputting the decoded audio, the audio output is spatially output to correspond to how a user would have heard the audio being captured by the source device. According to some examples, the decoded audio may include spatial information, such as the location of the source of the audio signals with respect to the microphones capturing the audio signals. The decoded audio may, when output, may sound as if the audio output was coming from the same, or substantially, position with respect to the output speakers as the position of the source of the audio signals with respect to the microphones capturing the audio signals.

As shown in FIG. 1, decoder 109A may be trained to decode the intermediary representation encoded by encoder 108. Encoder 108 may be a binaural or ambisonic encoder. In such an example, decoder 109A may be trained to decode the encoded audio into binaural or ambisonic audio, respectively. In some examples, if encoder 108 is an encoder for a specific type of device, such as a home assistant device, smartphone, earbuds, etc., decoder 109A may be decoder for the corresponding type of device. In some examples, first device 100 may include one or more additional decoders, such as decoder 119B, 109N. Decoder 119B may be configured to decode encoded audio data from encoder 118. For example, decoder 119B may decode encoded audio data that was encoded by encoder 118 and transmitted from second device 110 to first device 100. In some examples, decoder 119B may be another binaural and/or ambisonic decoder. Decoder 119B may decode the intermediary representation to correspond to binaural or ambisonic output based on encoder 118. First device 100 may have any number of decoders, represented by decoder 109N. Each additional decoder 109N may have been trained with a corresponding encoder of another device.

The ML model may be an encoder-decoder model. The encoder-decoder model may be trained using one or more training examples. According to some examples, the encoder-decoder model may be trained using one or more transfer functions. The one or more transfer functions may be, for example, a device related transfer function ("DRTF") 344. An orientation selector may match the DRTF with a head related transfer function ("HRTF") or ambisonic related transfer function ("ARTF"). The ML model may generate either waveform or spectrograms as output.

Encoder 108 may be trained using the encoder-decoder model to encode audio signals captured by microphones 105 into an intermediary representation. The intermediary representation may be compressed audio signals. In some examples, the intermediary representation may include spatial data, such as transfer functions or binaural or ambisonic configuration data. Decoder 109 may be trained, using the encoder-decoder model, to decode the encoded audio. Decoder 109 may decode the audio into binaural output or ambisonic output.

First device 100 may include one or more speakers 106. The speakers 106 may output the decoded audio. According to some examples, if first device 100 includes two speakers, such as a left and a right speaker, sound encoded with spatial data indicating the sound source was to the right of second device 110 may be output such that more sound is output from the right speaker than the left speaker.

First device 100 may include an orientation module 120. Orientation module 120 may, in some examples, convert the binaural or ambisonic output from decoder 109 to spatial audio output. The spatial audio output may, in some examples, be output by a plurality of speakers 106. In some examples, orientation module 120 may convert ambisonic output from decoder 109 into binaural or spatial output. The binaural or spatial output may, in some examples, be output by speakers 106.

Second device 110 may include one or more processors 111, memory 112, instructions 113, data 114, microphone(s) 115, speaker(s) 116, communications interface 117, an encoder 118, one or more decoders 119, and orientation module 121 that are substantially similar to those described herein with respect to first device 100.

Figure 2:
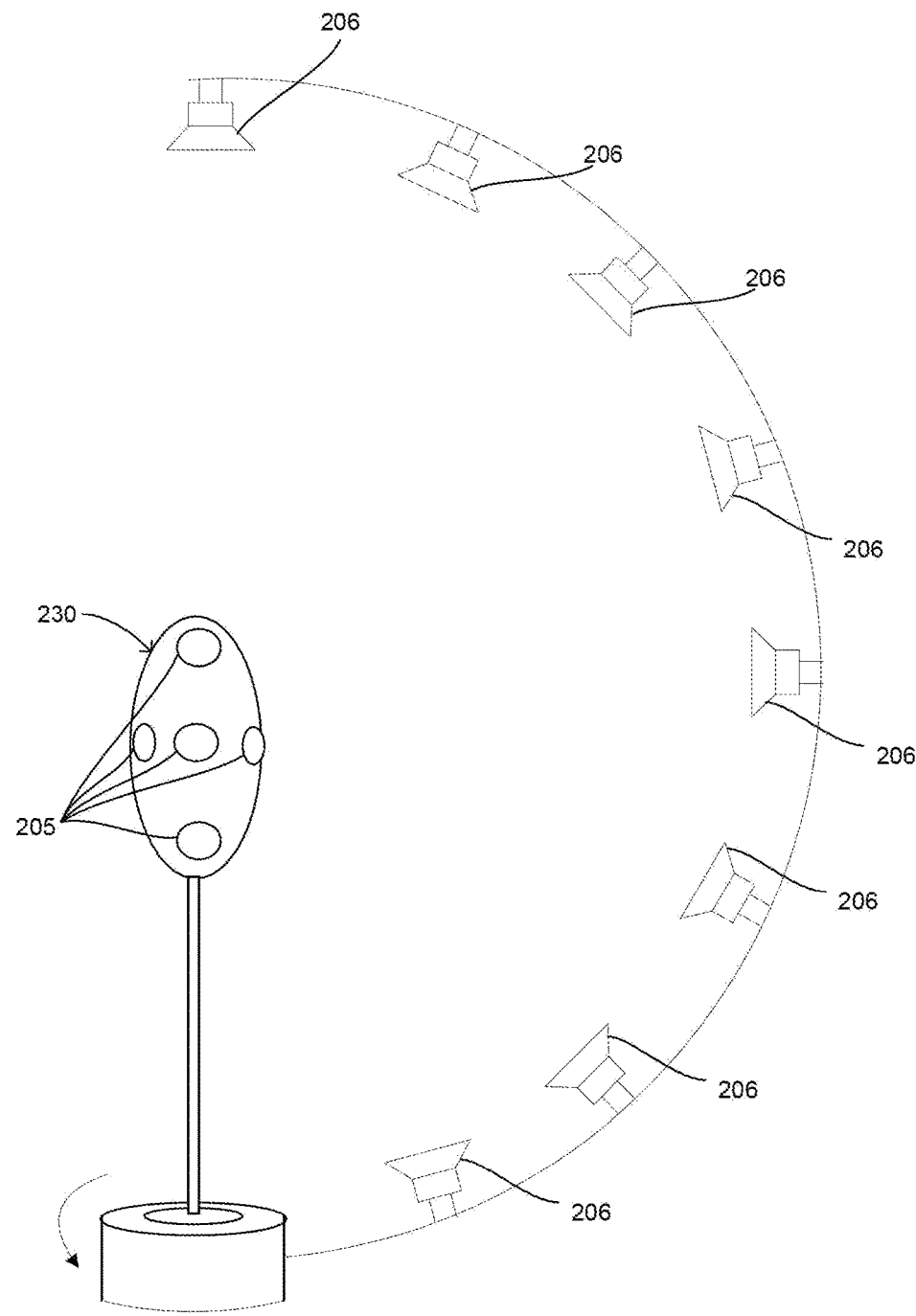
FIG. 2 illustrates an example system for collecting impulse responses in accordance with aspects of the disclosure.

FIG. 2 illustrates an example system for collecting spatial transfer functions. The system 2000 may include a device 230 having one or more microphones 205 configured to capture audio signals. According to some examples, the microphones 205 may be ambisonic microphones, such that the microphones are facing multiple directions.

The device 230 may be located in an environment with one or more speakers 206 configured to output audio signals. The speakers 206 may be arranged in an arc, or semi-circular shape, extending from a base of the device. The arc may extend from a ground plane relative to the base device to a point above an apex of the device 230. The speakers 206 may be arranged such that the microphones 205 on the device 230 may capture audio signals from varying heights and/or distances relative to the location of the device 230. Thus, while the speakers 206 are shown in a semi-circular configuration, the speakers 206 may be in any configuration that would allow microphones 205 on device 230 to capture audio signals from varying heights, distances, and/or angles.

The device 230 may rotate as audio is output by the speakers 206. The microphones 250 of the device 230 may capture the audio signals. The microphones 205 may capture a 360 degree audio spatial impulse response. The audio signals captured by the microphones 205 may be used as input for training the encoder-decoder model.

Figure 3:
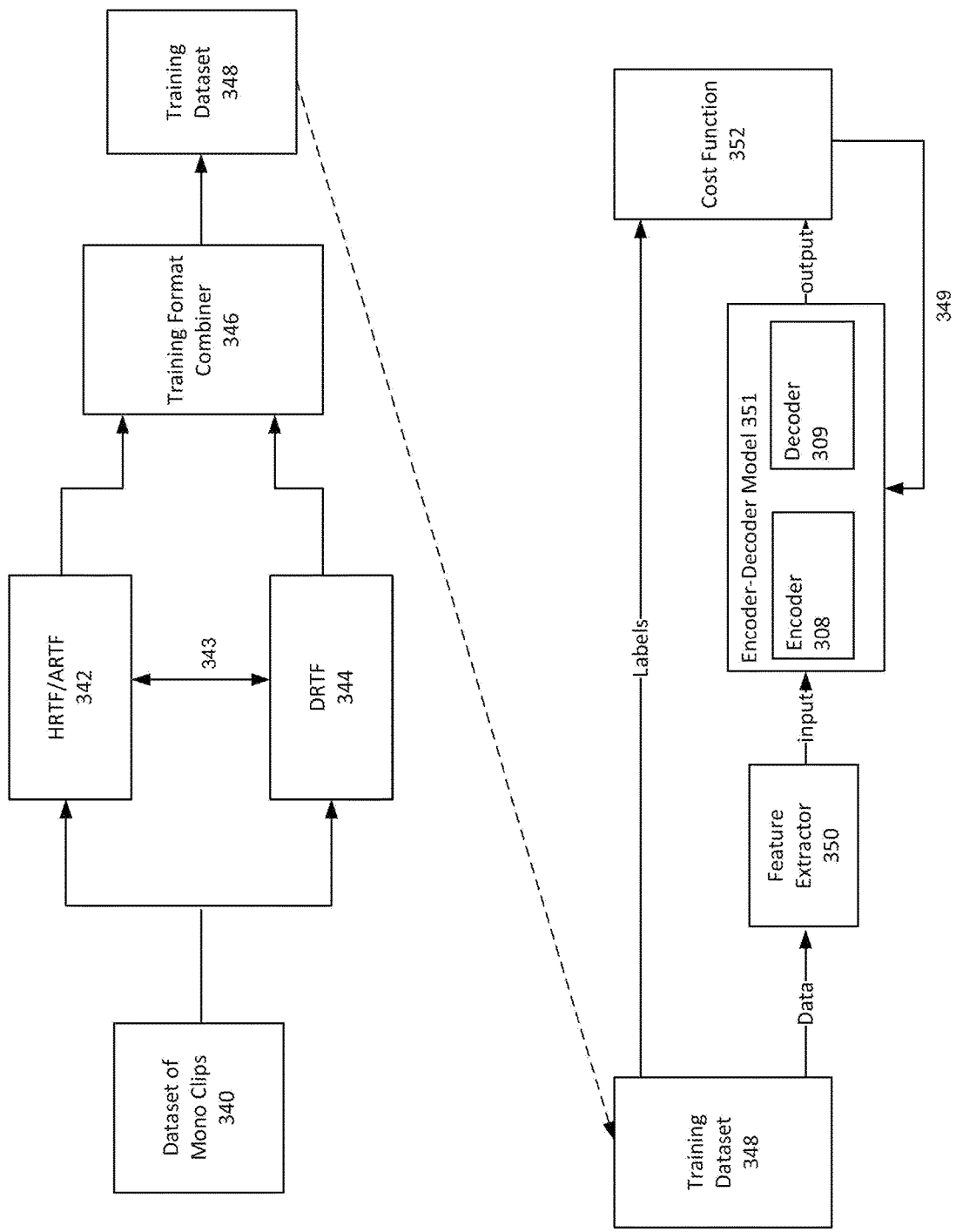
FIG. 3 is a flow diagram illustrating an example method of training a machine learning model in accordance with aspects of the disclosure.

FIG. 3 illustrates an example flow chart for training the encoder-decoder model. For example, the encoder-decoder model may be trained using one or more training examples. The training examples may be data that has been collected and preprocessed before being used as input into the encoder-decoder model.

According to some examples, the training examples may be labeled impulse responses. As discussed above with respect to FIG. 2, a device with one or more microphones may move and/or rotate within an environment to collect audio impulse response in all directions. The microphones on the device may be binaural microphones or ambisonic microphones. The dataset of mono clips 340 may be convolved with the collected audio impulse responses to create the various input and label data sets. An orientation selector 343 may specify the azimuth, elevation, and, in some examples, a distance between the microphones and the audio source. For a given orientation, a DRTF 344 may be matched with a HRTF or ARTF 342. The DRTF 344 may be the impulse response captured by the microphones of a device, such as a home assistant device. Collected audio impulse responses labeled as HRTF may be audio impulse responses that correspond to a binaural response of a head-and-torso simulator. Collected audio impulse responses labeled ARTF may be audio impulse responses that correspond to an ambisonic microphone device. The labeled audio impulse responses may be formatted into a compatible format by a training format combiner 346. For example, the training format combiner 346 may format each labeled audio impulse response into the same and/or a compatible format to be used as a training example for the encoder-decoder model. One or more training examples may be included in a training dataset 348.

Each training example in the training dataset 348 may include the impulse response, e.g. DRTF, and a corresponding label, e.g. ARTF or HRTF. A feature extractor 350 may extract various features of the impulse response. For example, the feature extractor 350 may identify quantifiable characteristics of the training example, or impulse response. In some examples, the features may be acoustic features, such as Log-Mel Spectrogram or per-channel amplitude normalization ("PCAN"). The Log-Mel Spectrogram may be calculated for a time frequency representation of the impulse response. In some examples, the extracted features may be fed into the encoder-decoder model 351 for training the model. The feature extractor 350 may be fixed based on prescribed parameters, such as a number of channels, a frame-size, a frame step, a type of transformation, etc. In some examples, the feature extractor 350 may be a signal preprocessor. For example, the feature extractor 350 may receive the impulse response as input and output features related to the impulse response. According to some examples, raw impulse responses, such as raw waveforms, may be fed directly into the encoder-decoder model 351 and the model may extract the features.

The encoder-decoder model 351 may receive the extracted features of the training example from feature extractor 340. The encoder-decoder model 351 may train the encoder 308 and decoder 309 based on the extracted features. In some examples, the encoder-decoder model 351 may receive the impulse response and the encoder-decoder model 351 may extract the features during training of the encoder 308 and decoder 309.

An encoder 308 may be trained by the encoder-decoder model 351. For example, the encoder 308 may be trained to encode audio signals with DRFT. The DRTF may include directional information, such as the azimuth, elevation, and/or distance between the microphone and the source. In some examples, the encoder 308 may use the trained encoder-decoder model 351 to encode audio signals with audio configuration data. The audio configuration data may be, for example, binaural or ambisonic configuration data. The encoded audio may have a low bit rate as compared to an uncompressed transmission.

A decoder 309 may be trained by the encoder-decoder model 351 to decode the encoded audio data transmitted from an encoder 308, wherein the encoder 308 and decoder 309 were jointly trained. The decoder 309 may decode the encoded audio signals into binaural or ambisonic output.

The encoder 308 and decoder 309 may be jointly trained using encoder-decoder model 351. For example, the encoder 308 may be trained to encode audio signals captured by microphones with head end information. In some examples, the head end information may be the DRTF. The encoder may, additionally or alternatively, encode the audio with spatial data. The spatial data may be, for example, binaural or ambisonic spatial data.

According to some examples, the encoder-decoder model 351 may be trained end-to-end, for example using back-propagation with either stochastic, mini-batch, or batch gradient descent. In such an example, there may be a forward pass on the encoder 308, a loss function calculation 352, and then a backward pass across the encoder-decoder model 351. In a forward pass, the encoder 308 may receive raw impulse responses or features corresponding to the raw impulse responses, the latter of which can be generated using the feature extractor 340. The encoder 308 may pass the output of encoder 308 to decoder 309 as input. The cost function 352 may calculate the loss between the output of the decoder 309 and a label corresponding to the input training example. In a backwards pass, the loss is back-propagated through the encoder-decoder model 351 to update model parameter values of the model, e.g., weights and biases.

The encoder-decoder model 351 may train the encoder 308 to output encoded compressed audio signals with spatial information. The encoder-decoder model 351 may train the decoder 309 using the encoded compressed audio signals with spatial information as input such that the decoder outputs decoded spatial audio data. The loss function calculation may, in some examples, determine the bit rate for transmitting the encoded audio data.

The encoder 308 may encode features into an intermediary representation. The decoder 309 may decode the intermediary representation into a model output. The model output may be, for example, spatial audio data. The spatial audio data may be binaural audio data and/or ambisonic audio data. According to some examples, the model output may be a waveform or spectrogram.

The cost function 352 may process the intermediary representation and/or the model output and the label from the training example. The cost function 352 may determine a loss value between the output of the system during training for a set of input training examples and a true output (or "ground truth") label for each of the input training example. For example, the cost function 352 may determine the difference between the predicted model output and the label of the training example. In some examples, the cost function 352 may determine how often the encoder-decoder model is wrong and/or how far off the predicted model output is to the label of the training examples.

According to some examples, after the cost function 352 processes the intermediary representation and/or the model output and the label from the training example, the cost function 352 may output, or identify, a modification to the model coefficient. As encoder-decoder model 351 is trained, the model coefficients may continue to be modified. For example, the cost-function 352 may be used as part of a feedback loop 349 when training the encoder-decoder model 351. After encoder-decoder model 351 is trained, the model coefficients may convert to optical coefficients, or values.

The cost function 352 may, in some examples, determine the bit rate for transmitting the encoded audio data. According to some examples, the cost function 352 value and the bit rate may be proportional. For example, the bit rate may be reduced when the cost function 352 value increases.

Figure 4A:
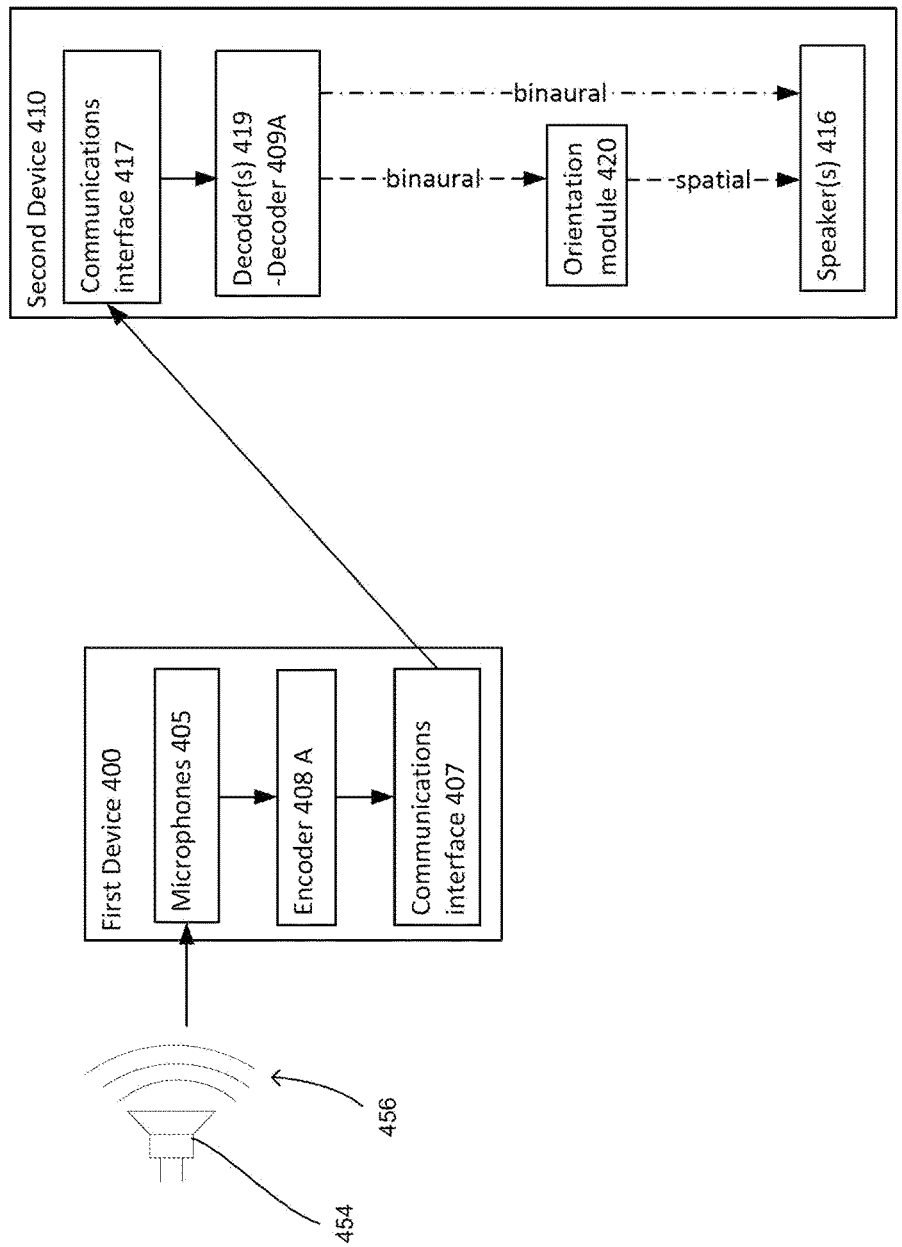
FIGS. 4A and 4B are flow diagrams illustrating an example method of outputting binaural and spatial audio in accordance with aspects of the disclosure.
Figure 4B:
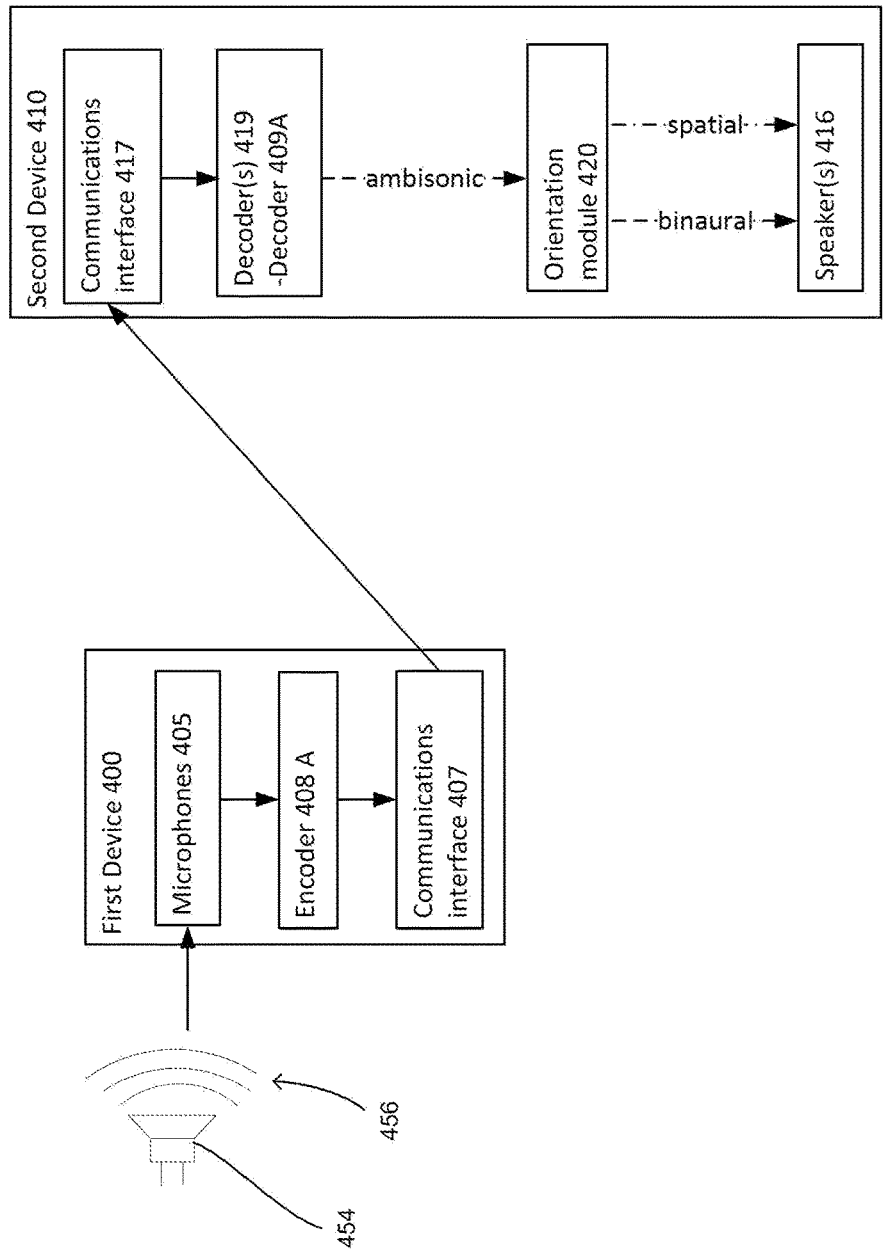

FIGS. 4A and 4B illustrate examples of a first device encoding captured audio signals and a second device decoding the encoded audio signals using a trained ML model. For example, a first device 400 may include a plurality of microphones 405 configured to capture audio signals 456 from an audio source 454. While illustrated as a speaker in this example, the audio source 454 may be a person and/or any other thing capable of producing sound.

Encoder 408A may encode the captured audio signals using a trained ML model, such as the encoder-decoder model described above. Encoder 408A may encode the audio signals with audio data, head end information, and/or spatial data. Audio data may be the impulse response or waveform captured by microphone 405. Head end information may be, for example, DRTF. Spatial data may be, for example, binaural or ambisonic configuration data. The encoder 408A may encode and/or compress the captured audio signals. Compressed audio signals may require a lower bit rate for transmission to a second device as compared to uncompressed audio signals.

Encoder 408A may be trained to encode the captured audio signals 456 into spatial audio based on the shape of first device 400 and/or the configuration of microphone 405 on first device 400. For example, based on the characteristics and/or location of microphones 405, encoder 408A may encode the captured audio signals 456 to include spatial data such that the encoded audio corresponds, or substantially corresponds, to how a user would have heard the audio signals 456 if they were at or near the audio source 454. In contrast, first device 400 captured audio signals 456 and transmitted the captured audio as is, the transmitted audio may be stereo audio instead of spatial audio.

Communications interface 407 of first device 400 may transmit the compressed encoded audio to a communications interface 417 of a second device 410. Second device 410 may include one or more decoders 419, 409A. Decoder 409A may be a decoder that was jointly trained with encoder 408A of first device. For example, decoder 409A may be trained using the ML model that was used to trained encoder 408A. According to some examples, decoder 409A may be trained to decode compressed encoded audio specific to the device of encoder 408A. In such an example, decoder 409A may decode the compressed encoded audio into output that corresponds, or substantially corresponds, to how a user would have heard the audio signals 456 if they were at or near audio source 454.

As shown in FIG. 4A, decoder 109A may decode the compressed encoded audio into binaural output. According to some examples, decoder 109A may be trained using two separate encoder-decoder models to output binaural and ambisonic outputs. For example, decoder 109A may be trained using a first encoder-decoder model to output binaural output and a second encoder-decoder model to output ambisonic outputs. In some examples, decoder 109A may be trained using a single encoder-decoder model to output binaural and ambisonic outputs.

In some examples, the second device 410 may output the binaural audio via speakers 416. Binaural audio output may correspond to how a user would receive sound at two ears, wherein soundwaves hit each ear at different time and at different volumes such that the user can perceive an origin of the sound. By way of example, binaural audio may be adapted for output through a pair of earbuds, headphones, or other on-head or in-ear devices. According to some examples, second device 410 may output binaural audio when second device 410 includes two speakers, such as a left and right speaker. For example, if second device 410 is a pair of earbuds, including a right earbud and a left earbud, second device 410 may output binaural audio.

In another example, orientation module 420 may convert the binaural audio into spatial audio. Spatial audio output may correspond to how a user would have heard the audio signals if they were at the location of first device 400. For example, spatial audio output may have audio appear to be coming from a source behind, in front of, next to, etc. the user. In some examples, spatial audio may make the audio output by speakers 416 appear more lifelike and real. When outputting spatial audio, the audio output by each speaker 416 may have a different volume level to make the output sound like the audio is coming more from one side than the other.

In some examples, orientation module 420 may convert the binaural output into spatial audio to correspond to the number of speakers 416 of second device. Once the binaural output is converted into spatial audio, second device 410 may output the spatial audio via speakers 416. For example, if second device 410 is a surround sound audio system, second device may have five (5), seven (7), etc. number of speakers.

FIG. 4B is similar to FIG. 4A except that decoder 409A decodes the compressed encoded audio into ambisonic output. Decoder 409A may decode the compressed encoded audio based on how decoder 409A was trained. For example, decoder 409A may be trained using an encoder-decoder model to output ambisonic outputs. The orientation module 420 may convert the ambisonic output into binaural audio or spatial audio. Second device 410 may output the binaural audio or spatial audio via speakers 416.

Example Use Cases

Figure 5:
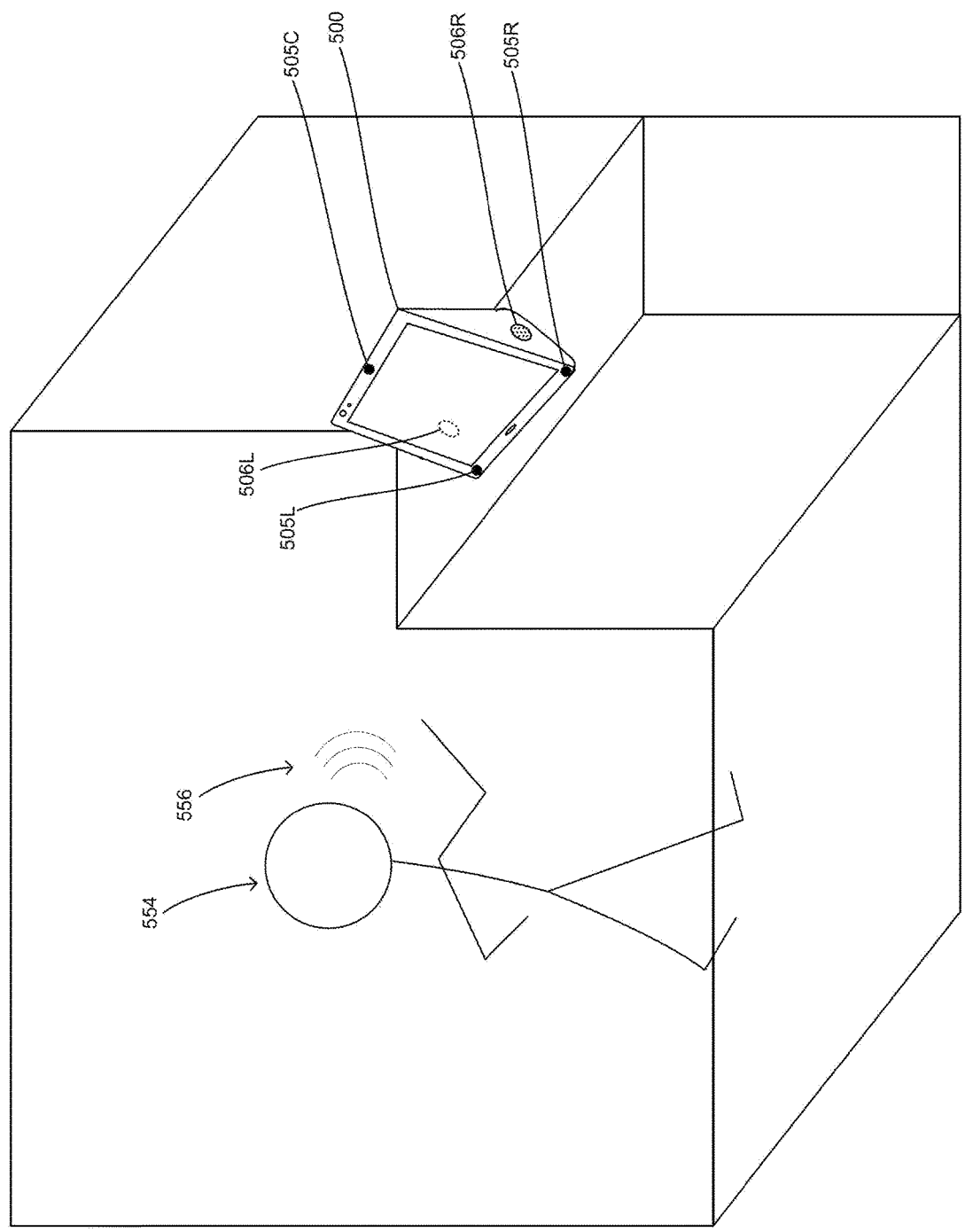
FIG. 5 illustrates an example environment for capturing audio signals in accordance with aspects of the disclosure.

FIG. 5 illustrates an example environment for capturing audio signals. For example, environment 5000 may include a first device 500 and an audio source. In this example, the audio source may be a user 554.

First device 500 may include speakers 506R, 506L. Speaker 506R may be located on a right side of first device 500 and speaker 506L may be located on a left side of first device 500 from a perspective of the user 554 facing first device.

First device 500 may include microphones 505R, 505L, 505C. As shown, microphones 505R, 505L, 505C may be part of first device 500. In some examples, microphones 505R, 505L, 505C may be wirelessly coupled to first device 500 and/or coupled to first device 500 via a wire. Microphone 505R may be located on the right side of first device 500, microphone 505C may be located on a left side of first device 500, and microphone 505C may be located in the center of device 500 from a perspective of the user 554 facing first device 500. In some examples, microphone 505C may located at the top of first device 500 while both microphones 505R, 505L may be located at the bottom of first device 500. That is, microphones 505R, 505L, 505C may be positioned on first device 500 at different coordinates relative to each other. For clarity purposes, microphone 505 may be used to refer to more than one microphone within environment 5000, whereas microphone 505R, 505L, 505C may be used to refer to the specific microphone within environment 5000. While a right, center, and left microphone 205R, 205C, 205L, are described, it is only one example configuration of microphones and is not intended to be limiting. For example, first device 500 may additionally or alternatively include additional microphones positioned around an environment, at different height levels relative to each other, and/or at different distances relative to the first device. Thus, the device may include any number at any location within the environment.

Each microphone 505 may capture audio signals 556 from the environment 5000. The audio signals 556 may be, for example, the speech of the user 554. The user 554 may located to the left of first device 200. As the user 554 speaks, each microphone 505 may capture the audio signals 556. In some instances, only a subset of microphones may receive audio signal 556. For instance, if the audio signal is relatively soft, only the left microphone, or the left and center microphone, may capture the audio signal 556.

First device 500 may include an encoder similar to the encoders described above. The encoder of first device 500 may encode the captured audio signals 556 using a trained ML model. The encoder may encode the audio with head end information, such as a DRTF. In some examples, the encoder may encode the captured audio signals 556 with spatial information. For example, the ML model may determine whether to encode the captured audio signals 556 with binaural or ambisonic configuration data based on how the ML model was trained. According to some examples, the ML model may be trained to encode the captured audio signals based on a device type and/or spatial audio type the ML model was trained for. For example, the ML model may be trained to encode the captured audio signals with binaural configuration data, ambisonic configuration, or both binaural and ambisonic configuration data. In some examples, the ML model and, therefore, the encoder may be trained to only encode the captured audio signals with binaural or ambisonic configuration data.

Figure 6A:
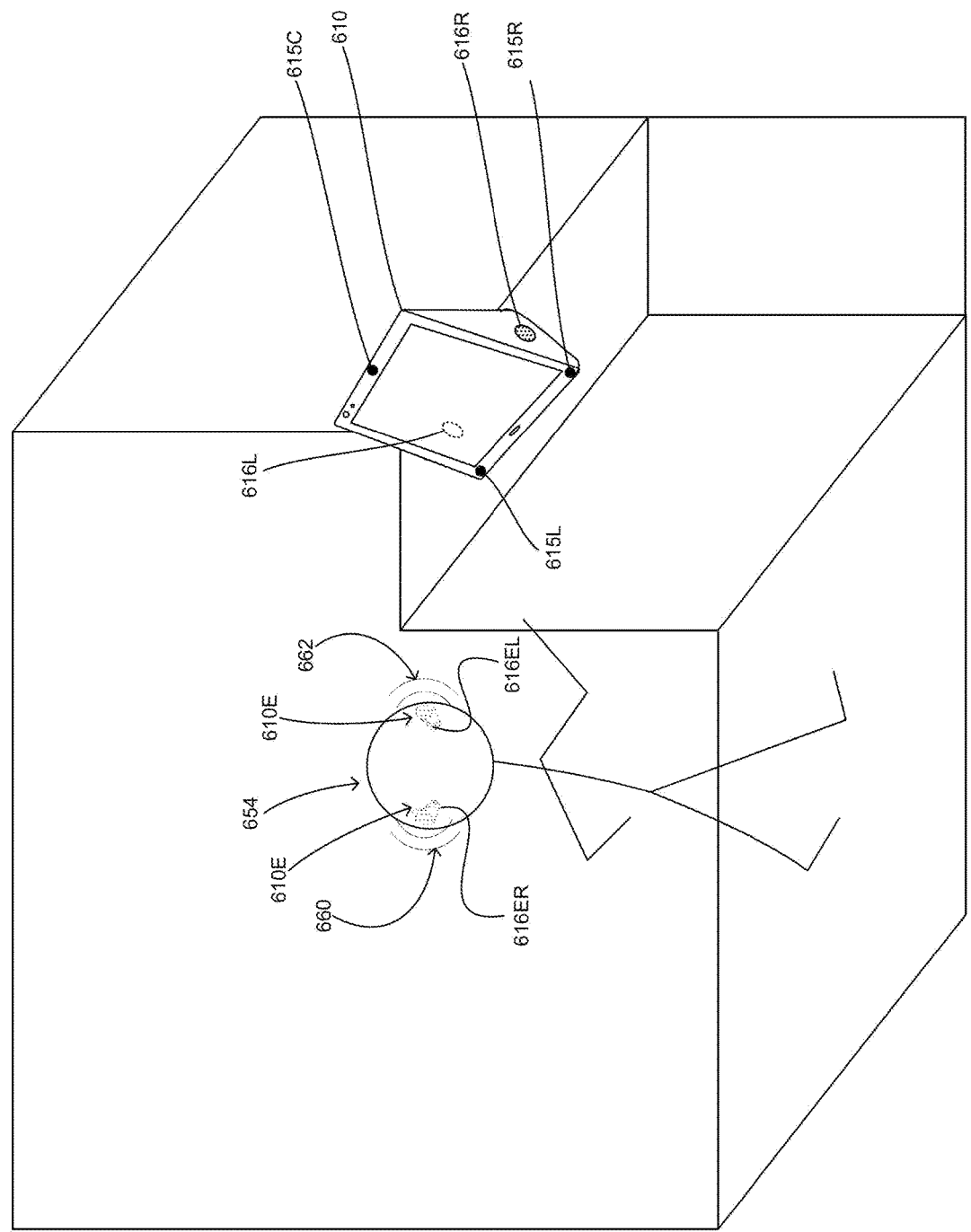
FIGS. 6A-6C illustrate example environments for outputting audio signals in accordance with aspects of the disclosure.
Figure 6B:
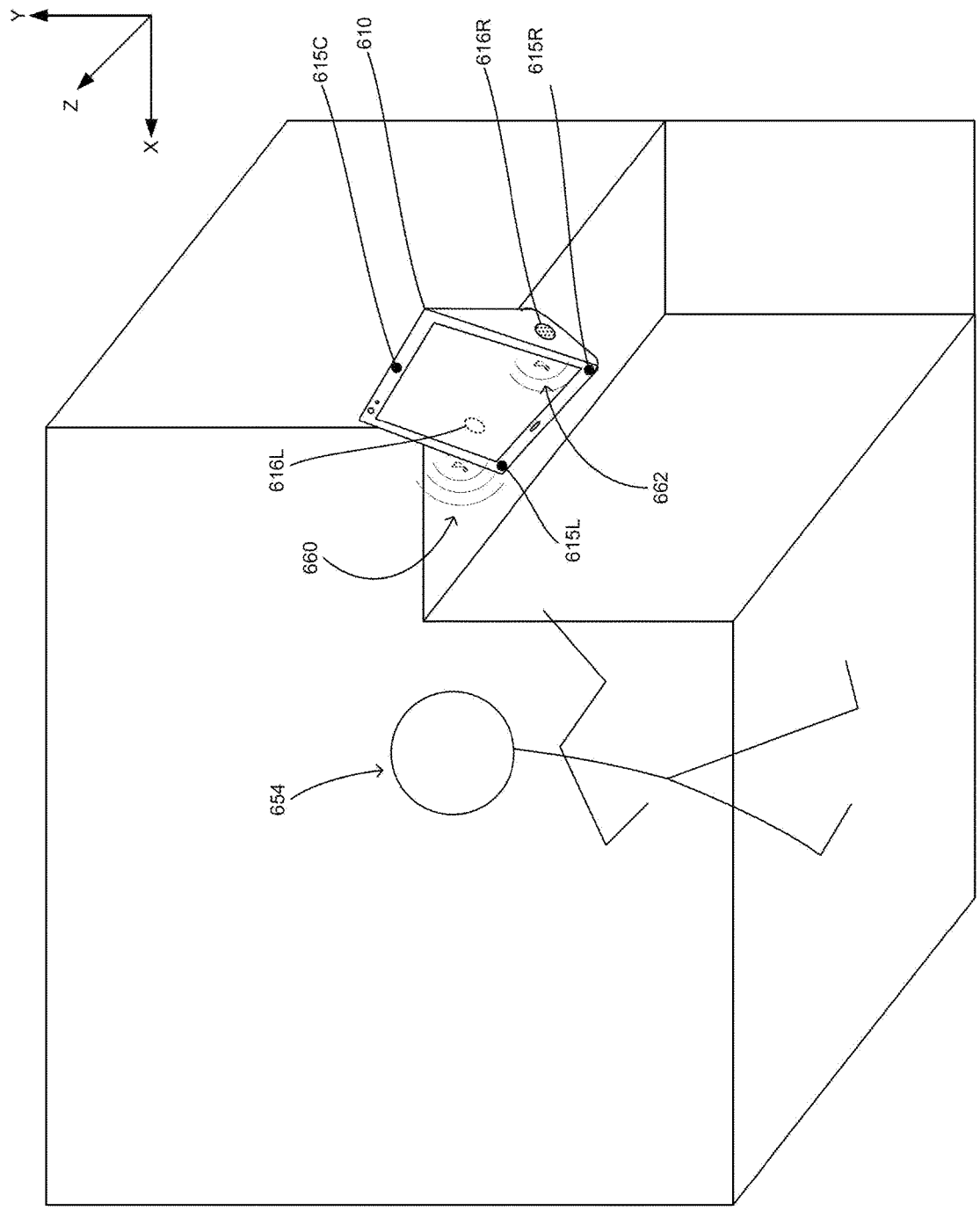
Figure 6C:
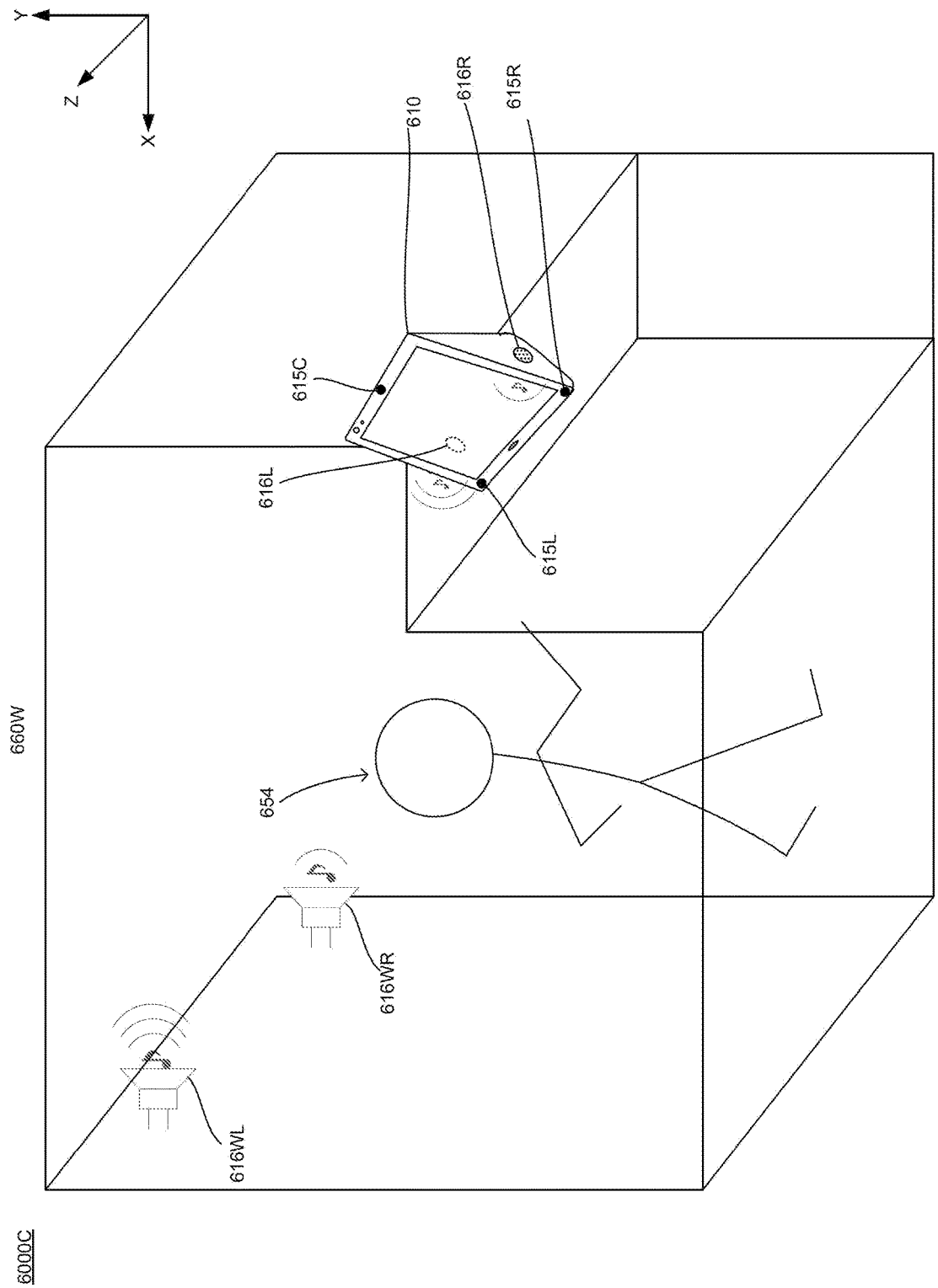

First device 500 may include a communications interface, not shown, similar to the communications interfaces described above and herein. First device 500 may be connected to a second device 610, as shown in FIGS. 6A-6C, via a communications link. The communications interface of the first device 500 may transmit and receive data, such as encoded audio signals, to and from second device 610 via the communications link.

Prior to and/or during the initiation of the communications link between first device 500 and second device 610, data packets may be transmitted to and from first device 500 and second device 610. The data packets may include information identifying first device 500 and second device 610. For example, the identifying information may be a type of device, a type of encoder, available decoders, identification of a target and source device, etc. The information may be used by first and second device 500, 610 to identify which decoder to use when receiving compressed encoded audio from the other device. For example, second device 610 may use the information to identify a decoder that was jointly trained with the encoder of first device 500 and vice versa. By using a decoder that was jointly trained with the encoder of the other device, the amount of data to be encoded and therefore compressed may be less as compared to having to encode and compress the captured audio for a variety of formats and/or other decoders.

First device 500 may transmit the encoded audio to second device 610. For example, each of the first and second devices 500, 610 may include one or more speakers 506, 616 for outputting audio signals. The second device 610 may decode the encoded audio signals into spatial output. This may allow for a user to have an immersive audio experience. According to some examples, the spatial audio output may correspond to how the user would have heard the audio if they were positioned where the audio source was positioned in environment 5000 relative to first device 500.

By encoding the audio data, head end information, and/or spatial configuration data of the audio input, the data required to transmit the audio to the second device may be decreased as compare to transmitting the audio via multiple and/or separate channels. For example, the encoded audio may compress the signals to be transmitted to the second device. Additionally or alternatively, by encoding the audio with the head end information, and/or spatial configuration data of the audio input, the device receiving the encoded audio may be able to decode the encoded audio into spatial output.

FIGS. 6A-6C illustrate example environments for outputting audio signals. For example, environments 6000A-C may include a second device 610 and a listener, such as user 654. The decoded audio, when output, may be configured to sound as if the output audio is from a position with respect to an output speaker corresponding to the position of the source of the audio input.

Second device 610 may include microphones 615R, 615L, 615C similar to microphones 605 described with respect to first device 500. Second device 610 may include speakers 616R, 616L for outputting audio signals. Speaker 616R may be located on a right side of second device 610 and speaker 616L may be located on a left side of second device 610 from a perspective of user 654 facing second device 610. For example, FIG. 6A shown an environment 6000A in which audio is output via a pair of earbuds 610E. Each earbud 610E may include one or more speakers 616ER, 616EL. As shown in FIG. 6B, speakers 616R, 616L may be part of second device 610. In some examples, speakers 616 may be wirelessly coupled to second device 610 and/or coupled to second device 610 via a wire. For example, FIG. 6C shows an environment 6000C that includes additional speakers 616WL, 616WR coupled to second device 610.

Second device 610 may receive the encoded audio from first device 600. Second device 610 may include a decoder configured to decode the encoded audio. The decoder of the second device may have been trained with the encoder of the first device 500. For example, the ML model used to train the encoder of the first device 500 may be used to train the decoder of the second device 610. In such an example, the decoder of the second device 610 may be trained to decode audio encoded by the encoder of first device 500. By having a decoder trained to decode audio encoded by the encoder of the first device 500, the decoder of the second device 610 may decode the audio to be spatially output to correspond or substantially correspond to how a user would have heard the audio if they were at or near the location of the audio source.

According to some examples, the decoder of the second device 610 may decode the encoded audio into binaural audio. FIG. 6A illustrates an example environment for outputting binaural audio. For example the decoder of the second device 610 may decode the compressed encoded audio into binaural output. As shown in FIG. 6A, speakers 616EL, 616ER may output the binaural output. In some examples, the binaural output may correspond, or substantially correspond, to how user 654 would have heard the audio if user 654 were positioned at the same, or substantially, the same location as user 554. For example, binaural output may sound the same regardless of user's 654 location and/or head orientation relative to the speakers 616EL, 616ER.

According to some examples, after the decoder of the second device decodes the encoded audio into binaural audio, the second device 610 may convert the binaural audio into spatial audio. For example, second device 610 may include an orientation module. The orientation module may convert the binaural audio into spatial audio.

As shown in FIGS. 6B and 6C, speakers 616L, 616R, 616WR, 616WL may output the spatial audio. In some examples, the spatial audio may be output to correspond, or substantially correspond, to how user 654 would have heard the audio signals if user 654 were positioned where user 554 was positioned in environment 5000. For example, the spatial audio may identify the location of the audio signal as originating from the left of the device. Second device 610 may decode the encoded audio into binaural audio. The second device may convert the binaural audio into spatial audio such that more sound 660 is output from the left speaker 616L than sound 662 being output from the right speaker 616R. According to some examples, if the location of the source of the audio signal 556 is closer to more in the negative x-axis and positive y-axis in a Cartesian coordinate system, then second device 610 may spatially output the audio more from the left speaker 616L than the right speaker 616 R.

FIG. 6C illustrates an environment 6000C in which additional speakers 616 may be connected to second device 610. Speakers 616WL, 616WR may positioned around the environment 6000C at different coordinates, heights, and/or distances relative to other speakers 316 and/or second device 310. Second device 610 may decode the encoded audio based on the four speakers 616R, 616L, 616WR, 616WL available for audio output. For example, second device 610 may decode the encoded audio into binaural audio. Second device 610 may, then, convert the binaural audio into spatial audio. The binaural audio may be converted into spatial audio to be output by the four speakers 616R, 616L, 616WR, 616WL.

The spatial audio output may correspond, or substantially correspond, to how user 654 would have heard the audio signals 556 if user 654 were positioned and where first device 500 was positioned in environment 5000. The spatial audio output may, additionally or alternatively, correspond or substantially correspond to how user 654 would have heard the audio signals 556 if user 654 were oriented to correspond to the orientation of first device 500 in environment 5000. For example, the left microphone 505L of first device 500 may correspond to the left ear of user 654 and the right microphone 505R may correspond to the right ear of user 654.

The spatial output may be output such that it appears to the user as if the sound is coming from behind and to the left user 654 based on the relative location of user 554 compared to first device 500. Speaker 616WL may, therefore, output more sound than speakers 616L, 616R, 616WR. In some examples, speaker 616L may output more sound than speaker 616R. Having more sound output from the left speakers 616WL, 616L than right speakers 616WR, 616R may make the sound appear to be coming from the left of user 654. Having more sound output from the speakers 616WL, 616WR behind the user than speakers 616L, 616R in front of the user may make the sound appear to be coming from behind user 654.

According to some examples, the decoder of the second device 610 may decode the encoded audio into ambisonic audio. The orientation module of the second device 610 may convert the ambisonic audio into binaural audio or spatial audio. For example, if the second device 610 is a pair of earbuds, the orientation module of the second device may convert the ambisonic audio into binaural audio. In some examples, if the second device 610 is a loudspeaker or a surround sound system, the orientation module may convert the ambisonic into spatial audio. FIG. 6A illustrates an example environment 6000A for outputting binaural audio. For example, after the orientation module of the second device 610 converts the ambisonic audio into binaural audio, the binaural audio may be output by speakers 616EL, 316ER. FIGS. 6B and 6C illustrate example environments 6000B, 6000C for outputting spatial audio.

While the above discusses the second device 610 receiving the encoded audio from the first device 500, the first device 500 may also be configured to receive encoded audio from the second device 610. The first device 500 may decode and output the encoded audio in the same or substantially the same way as the second device 610.

Example Methods

Figure 7:
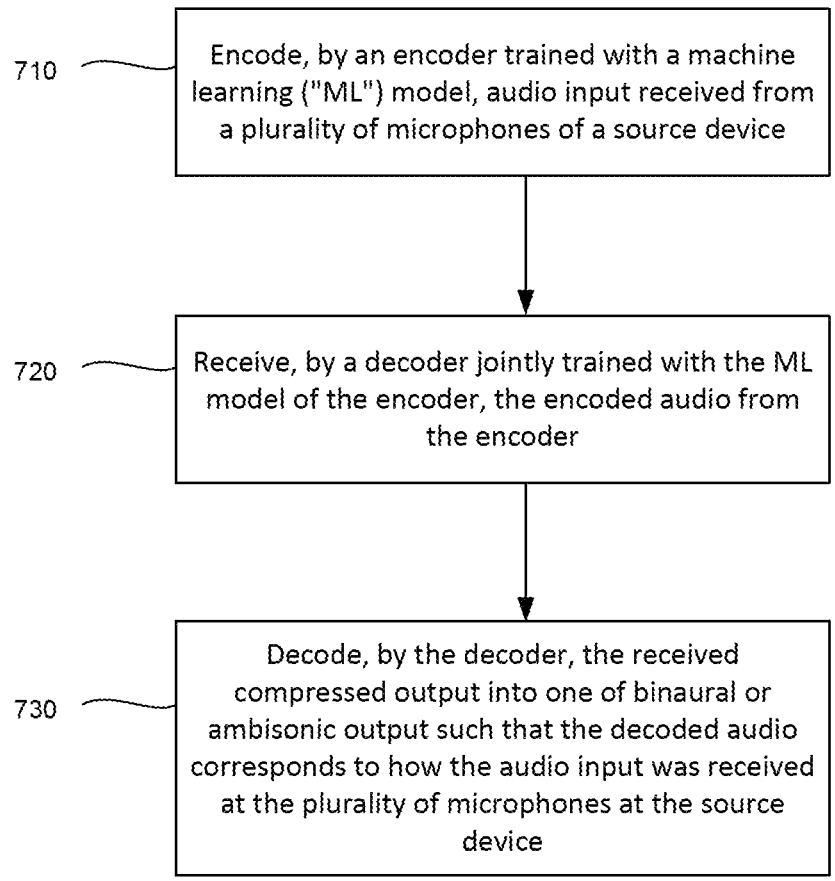
FIG. 7 is a flow diagram illustrating an example method of decoding audio data in accordance with aspects of the disclosure.

FIG. 7 illustrates an example method for encoding and decoding audio signals. The following operations do not have to be performed in the precise order described below. Rather, various operations can be handled in a different order or simultaneously, and operations may be added or omitted.

In block 710, an encoder trained with a ML model may be configured to encode audio input received from a plurality of microphones of a source device. For example, the source device may include a plurality of microphones configured to capture audio signals. The plurality of microphones may comprise one or more microphones in a plurality of different devices spaced from one another in an environment. In some examples, the plurality of microphones may comprise one or more microphone beamformed in different directions in a home assistant device. For example, a first microphone of the plurality of microphones may be beamformed in a first direction and a second microphone of the plurality of microphones may be beamformed in a second direction different than the first direction.

The encoder may be trained to encode the received audio input to include spatial data, such as transfer functions or binaural or ambisonic configuration data. The encoder may, additionally or alternatively, compress the encoded audio.

In block 720, a decoder jointly trained with the ML model of the encoder may be adapted to receive encoded audio from the encoder of the source device. For example, the decoder may be part of a target device. The source device and the target device may be in wireless communication.

In block 730, the decoder may decode the received encoded audio into one of binaural or ambisonic output such that the decoded audio corresponds to how the audio input was received at the plurality of microphones at the source device. The decoder may be jointly trained with the encoder of the source device. In some examples, the decoder trained using training data. The training data may comprise audio data labeled with respective compressed audio signals. The compressed audio signals may be labeled with a transfer function, such as DRTF, ARTF, and/or HRTF. In some examples, the compressed audio signals may be labeled binaural or ambisonic. At least one of the encoder or the decoder may execute a machine learning model trained using one or more transfer function. The machine learning model may be a neural network that can generate either waveform of spectrograms as output.

The decoded audio, when output, may have the same spatial characteristics as the audio input received by the plurality of microphones of the source device. In some examples, the decoded audio, when output, may be configured to sound as if the output audio is from a position with respect to an output speaker corresponding to a source position of the audio input.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
an encoder trained with a machine learning ("ML") model, the encoder configured to produce an encoded audio information based on an audio input received from a plurality of microphones of a source device, the encoded audio information comprising an audio information based on the audio input and a source device information based on a type or a shape of the source device; and
a decoder comprising a plurality of ML decoder models, at least one of the plurality of ML decoder models jointly trained with the ML model of the encoder, the decoder adapted to:
receive the encoded audio information from the encoder;
select, based on the source device information, a ML decoder model from the at least one ML decoder models jointly trained with the ML model of the encoder; and
decode, using the selected ML decoder model, the received encoded audio information into one of a binaural output or an ambisonic output such that the decoded audio corresponds to how the audio input was received at the plurality of microphones of the source device.

2. The system of claim 1, comprising the source device and a target device in wireless communication with one another, wherein the encoder is in the source device and the decoder is in the target device.

3. The system of claim 2, wherein the target device further includes an output configured to output the binaural or ambisonic output.

4. The system of claim 2, wherein the target device further includes an orientation module configured to convert the ambisonic output into one of a converted binaural output or a spatial output.

5. The system of claim 2, wherein the source device is configured to transmit, via a communication link, the encoded audio information to the target device.

6. The system of claim 1, wherein ML model is trained using training data comprising audio data labeled with respective compressed spatial audio signals.

7. The system of claim 1, wherein the source device is one of an assistant hub, thermostat, smart display, audio playback device, smart watch, doorbell, or security camera.

8. The system of claim 1, wherein the encoder is further configured to compress the encoded audio information.

9. The system of claim 1, wherein the decoded audio information, when output, has the same spatial characteristics as the audio input received by the plurality of microphones of the source device.

10. The system of claim 1, wherein a first microphone of the plurality of microphones is beamformed in a first direction and a second microphone of the plurality of microphones is beamformed in a second direction different than the first direction.

11. The system of claim 10, wherein the encoder is further configured to:
receive, from the first and second microphones, data corresponding to the first beamformed direction and the second beamformed direction; and
further encode the audio information with the data corresponding to the first beamformed direction and the second beamformed direction.

12. The system of claim 11, wherein the decoded audio information, when output, has sound characteristics from a perspective of a listener that correspond to sound characteristics of the audio input from a perspective of the source device.

13. A method, comprising:
producing, by an encoder trained with a machine learning ("ML") model, an encoded audio information based on an audio input received from a plurality of microphones of a source device, the encoded audio information comprising an audio information based on the audio input and a source device information based on a type or a shape of the source device;
receiving, by a decoder comprising a plurality of ML decoder models, at least one of the plurality of ML decoder models jointly trained with the ML model of the encoder, the encoded audio information;
selecting, by the decoder and based on the source device information, a ML decoder model from the at least one ML decoder models jointly trained with the ML model of the encoder; and
decoding, by the decoder and using the selected ML decoder model, the received encoded audio information into one of a binaural output or an ambisonic output such that the decoded audio information corresponds to how the audio input was received at the plurality of microphones at the source device.

14. The method of claim 13, further comprising establishing a communication link between the source device and a target device, wherein the encoder is in the source device and the decoder is in the target device.

15. The method of claim 14, wherein the target device further includes an output, the method further comprising outputting, by the output of the target device, the binaural or ambisonic output.

16. The method of claim 14, wherein the target device further includes an orientation module and the method further comprises converting, by the orientation module, the ambisonic output into one of a converted binaural output or a spatial output.

17. The method of claim 14, further comprising transmitting, by the source device and via the communication link, the encoded audio information to the target device.

18. The method of claim 13, wherein the ML model is trained using training data comprising audio data labeled with respective compressed spatial audio signals.

19. The method of claim 13, wherein the source device is one of an assistant hub, thermostat, smart display, audio playback device, smart watch, doorbell, security camera.

20. A system, comprising:
a decoder comprising a plurality of machine learning ("ML") decoder models, at least one of the plurality of ML decoder models jointly trained with a ML model of an encoder, the ML model of the encoder configured to encode audio information based on an audio input received from a plurality of microphones of a source device, the encoded audio information comprising:
an audio information based on the audio input; and
a source device information based on a type or a shape of the source device,
the decoder adapted to:
select, based on the source device information, a ML decoder model from the at least one ML decoder models jointly trained with the ML model of the encoder;
receive the encoded audio information from the encoder;
decode the encoded audio information using the selected ML decoder model; and transform the received encoded audio information into one of a binaural output or an ambisonic output such that the transformed output corresponds to how the audio input was received at the plurality of microphones of the source device.

* * * * *